(12) United States Patent
Blomberg (10) Patent No.: US 6,931,935 B2
(45) Date of Patent: Aug. 23, 2005

(54) SURFACE-MICROMACHINED ABSOLUTE PRESSURE SENSOR AND A METHOD FOR MANUFACTURING THEREOF

(75) Inventor: Martti Blomberg, Espoo (FI)

(73) Assignees: Vaisala OYJ, Helsinki (FI); Valtion Teknillinen, Espoo (FI)

( * ) Notice: Subject to any disclaimer, the term of this patent is extended or adjusted under 35 U.S.C. 154(b) by 0 days.

(21) Appl. No.: 10/416,267

(22) PCT Filed: Nov. 7, 2001

(86) PCT No.: PCT/FI01/00970

§ 371 (c)(1),
(2), (4) Date: May 9, 2003

(87) PCT Pub. No.: WO02/38491

PCT Pub. Date: May 16, 2002

(65) Prior Publication Data

US 2004/0020303 A1 Feb. 5, 2004

(30) Foreign Application Priority Data

Nov. 10, 2000 (FI) .............................. 20002472

(51) Int. Cl.[7] .............................. G01L 9/12
(52) U.S. Cl. .......................... 73/718; 73/724; 359/290
(58) Field of Search .................. 73/718, 724; 359/290; 307/10.1

(56) References Cited

U.S. PATENT DOCUMENTS

| | | | | |
|---|---|---|---|---|
| 4,838,088 A | * | 6/1989 | Murakami | 73/724 |
| 5,506,454 A | * | 4/1996 | Hanzawa et al. | 307/10.1 |
| 5,707,077 A | * | 1/1998 | Yokota et al. | 280/735 |
| 5,725,785 A | * | 3/1998 | Ishida et al. | 216/2 |
| 5,802,684 A | * | 9/1998 | Fujiu et al. | 29/25.35 |
| 5,831,162 A | * | 11/1998 | Sparks et al. | 73/504.12 |
| 6,816,301 B1 | * | 11/2004 | Schiller | 359/290 |

FOREIGN PATENT DOCUMENTS

| | | |
|---|---|---|
| EP | 0727650 A2 | 8/1996 |
| WO | WO 02/02458 A1 | 1/2002 |

OTHER PUBLICATIONS

Smith, R.L. Proceedings of the Second International Symposium on Electrochemical Microfabrication. Edited by Datta, M. et al. Pennington: Electrochem. Soc, 1995, pp. 281–289.

Rinke T.J., et al. Appl. Phys. A 1999, vol. 68, No. 6, pp. 705–707.

Sensors and Actuators 85 (2000), pp. 147–152, "CMOS-compatible capacitive high temperature pressure sensors," Klaus Kasten et al.

J. Vac. Sci. Technol. A 18(4), Jul./Aug. 2000, pp. 1853–1858, "Polycrystalline silicon thin films with hydrofluoric acid permeability for underlying oxide etching and vacuum encapsulation," Y. Kageyama et al.

American Institute of Physics, pp. 41–42, "AIP Handbook of Condenser Microphones Theory, Calibration, and Measurements," G.S.K. Wong et al.

* cited by examiner

*Primary Examiner*—William Oen
*Assistant Examiner*—Andre Allen
(74) *Attorney, Agent, or Firm*—Birch, Stewart, Kolasch & Birch, LLP (57) ABSTRACT

A capacitive pressure sensor structure, in particular for measurement of absolute pressure, and a method for manufacturing the sensor. The sensor includes at least one fixed electrode, and at least one movable electrode electrically isolated from said fixed electrode and spaced apart from said fixed electrode. A portion of said movable electrode is formed from a porous polycrystalline silicon layer that in a finished component remains as an integral portion of said flexibly movable electrode.

17 Claims, 4 Drawing Sheets

SURFACE-MICROMACHINED ABSOLUTE PRESSURE SENSOR AND A METHOD FOR MANUFACTURING THEREOF

This application is the national phase under 35 U.S.C. § 371 of PCT International Application No. PCT/FI01/00970 which has an International filing date of Nov. 7, 2001, which designated the United States of America.

The invention relates to a capacitive pressure sensor according to the preamble of claim 1 and a method for manufacturing the same.

Traditionally, micromechanical pressure sensors are categorized in two classes according to their manufacturing method. A pressure sensor is categorized as a surface micromechanical sensor if it is manufactured using surface micromechanical techniques, while the term bulk micromechanical device is used if the fabrication of the sensor is based on the older bulk micromechanical technique.

On the basis of their constructional differences, pressure sensors are also categorized in two classes depending on whether the sensor is responsive to a differential pressure or an absolute pressure. The present patent application discloses a novel construction for a surface micromechanical absolute pressure sensor and a method for manufacturing the same.

Prior-art sensor structures are described, e.g., in publication K. Kasten et al.; Sensors and Actuators A, Vol. 85 (2000), pp. 147–152. In the sensor structure taught herein, the bottom electrode is formed from single-crystal silicon layer on a SIMOX substrate. The top electrode of the structure is made from polycrystalline silicon. The so-called sacrificial layer needed during fabrication is entirely removed via channels located at the edges of the electrodes. Next, the openings remaining from the etching of the sacrificial oxide layer during the manufacturing process are closed by depositing thereon silicon nitride using the PECVD process, whereby between the capacitive electrodes is formed a partial vacuum determined by the pressure of the PECVD process.

The shortcomings of the structure proposed by Kasten are obvious. Since the sacrificial layer is entirely etched away from the interior of the structure, a step discontinuity will remain on the flexible diaphragm at the edges of the sacrificial layer. Hence, the tensional stress of the flexible diaphragm must be controlled very low to prevent the inherent tensional stress of the diaphragm from bending it into contact to the bottom electrode. Resultingly, the capacitive elements must be made very small. Since a practicable sensor construction needs a capacitance in the order of 10 pF, a large number of capacitive elements is required. As a consequence, the relative proportion of the variable capacitance with regard to the overall capacitance remains low because of the element edge structures that in a large number of small elements increase the proportion of stray capacitance higher than what is achievable in such a sensor construction that facilitates the use of a larger capacitive element.

Also the reference structure in the absolute pressure sensor construction proposed by Kasten is problematic. Therein, the stiffening of the reference element electrode is solved by way of leaving onto the reference elements a thick layer of oxide deposited in the LPCVD process. Since the thermal expansion constants of elemental silicon and its oxide are different from each other, this arrangement may be expected to impart a higher temperature dependence to the reference element structure. As a rule, the temperature/humidity dependencies of the sensing and reference structures, respectively, should be as equal as possible.

It is an object of the present invention to overcome the problems of prior-art techniques and to provide an entirely novel type of absolute pressure sensor.

The goal of the invention is achieved by way of using a porous polycrystalline silicon layer as a portion of the flexible diaphragm of the sensor structure.

More specifically, the absolute pressure sensor according to the invention is characterized by what is stated in the characterizing part of claim 1.

Furthermore, the method according to the invention is characterized by what is stated in the characterizing part of claim 10.

The invention offers significant benefits.

The invention makes it possible to implement pressure sensors covering needs from the barometric range up to pressures in the order of hundreds of bars. The size of individual capacitive elements is sufficiently larger even at barometric pressures to keep the relative proportion of stray capacitances reasonably low. The area of the sacrificial layer to be etched away can be defined by lithography techniques, whereby the manufacturing tolerances are improved. A portion of the oxide acting as the sacrificial layer can be left unetched. As a consequence, the flexible diaphragm retains a straight shape at its edges. Resultingly, the internal tensional stress of the diaphragm can be adjusted high thus facilitating the use of a larger element size. The reference structure according to the invention is responsive to changes in ambient temperature and, e.g., humidity in the same manner as the pressure-responsive structure proper. Hence, the overall construction of the sensor can be made very stable and secondary factors causing extra temperature drift and dependence on ambient humidity can be readily compensated for.

In the following, the invention will be examined in greater detail with the help of exemplifying embodiments illustrated in the appended drawings in which.

Figure 1:
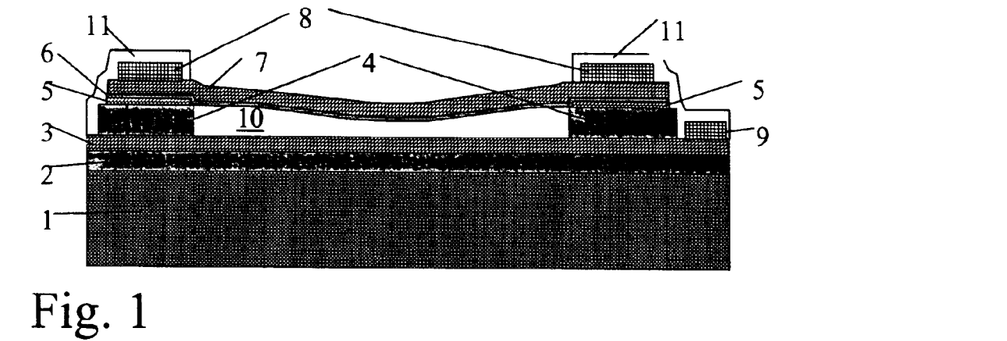
FIG. 1 is a cross-sectional view of a sensor element according to the invention.
Figure 2:
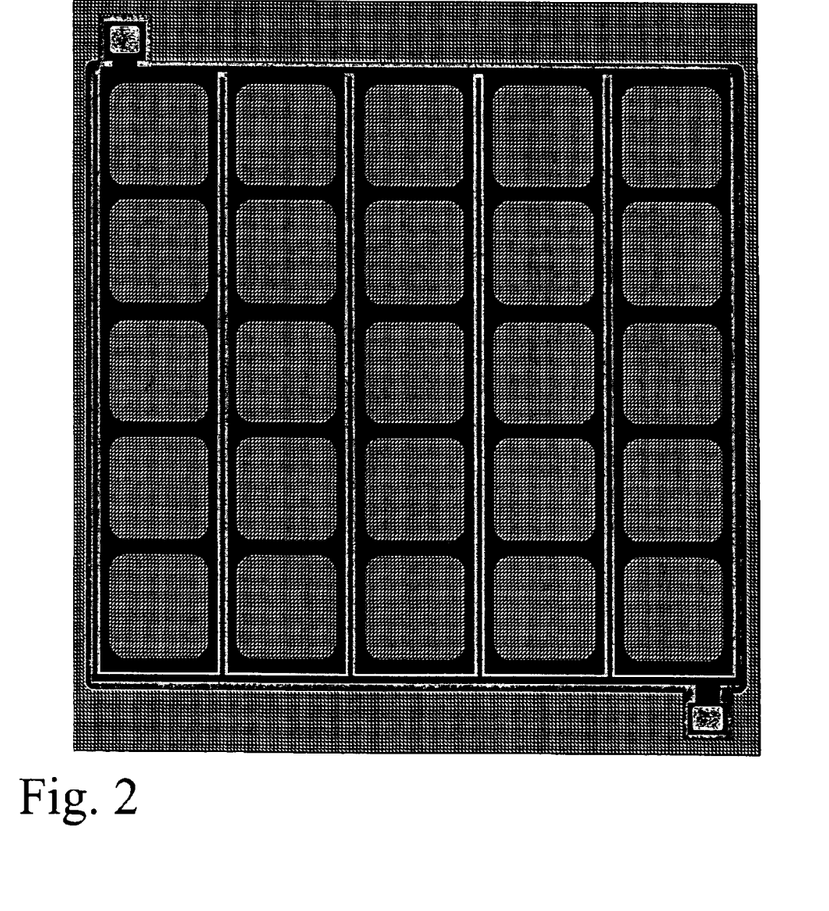
FIG. 2 is a top view of a capacitive pressure sensor comprised of elements (25 pcs.) shown in FIG. 1.

Referring to FIG. 2, a sensor element of an absolute pressure sensor according to the invention comprises a polycrystalline silicon layer 3 which is deposited on a dielectric layer 2 made on a silicon substrate 1, is doped conductive and has another dielectric layer 4 deposited thereon. Over these layers is deposited a polycrystalline silicon layer 5 having thereon deposited a polycrystalline silicon layer 6 containing small-diameter pore holes in abundance. Layer 5 is optional in the overall structure. It may be omitted if the definition of the sacrificial layer takes place by lithography technique after the deposition of the porous silicon layer. Layer 5 may also extend into the region above area 10. Then, the layer has one or more openings permitting layer 6 to communicate with area 10. Above the porous silicon layer is again deposited a uniform silicon layer 7 that serves as a substrate for metallization layer 8. Dielectric layer 4 and polycrystalline silicon layer 5 are removed from the center and edge areas of the capacitive element. At the edge area of the element, a metallization layer 9 is deposited onto the conductive polycrystalline silicon layer. With the exception of the contact areas and the flexible diaphragm, area 10 of the sensor structure is covered by a passivation layer 11.

Dielectric layer 2 is most advantageously silicon dioxide with a thickness of 500–2000 nm typical. Polycrystalline silicon layer 3 is made conductive by doping with phosphorus or boron, for instance. Layer 4 is made of a dielectric material, most advantageously silicon dioxide. Layer 5 is most advantageously made of doped polycrystalline silicon. Layer 6 is a porous, doped polycrystalline silicon layer having a thickness of about 100 nm. The conductive polycrystalline silicon layer 7 deposited on layer 6 is typically 100 nm to 5000 nm thick. In combination with the internal tensional stress of the capacitive element, the thickness of layer 7 plays a crucial role in the dimensioning of the sensor element. An example on the deposition technique of the porous silicon layer (with a high density of holes) is described, e.g., in publication Y. Kageyama, T. Tsuchiya, H. Fuanbashi, and J. Sakata: "Polycrystalline silicon thin films with hydrofluoric acid permeability for underlying oxide etching and vacuum encapsulation" J. Vac. Sci Technol. A 18(4), July/August 2000. An essential factor in the structure of layer 6 is that its pores are very small (with an average minimum diameter of less than 10 nm).

The metallization layers 8 and 9 make an electrical contact to layers 3 and 7. Most advantageously, metallization layers 8 and 9 are made by sputtering a 1000 nm thick aluminum layer. The sensor cavity defined by area 10 in the center region of the structure is at a partial vacuum. The deflection of layers 6 and 7 is determined by the differential pressure between the cavity area 10 and the ambient pressure. The shape and size of area 10, in combination with the thickness and tensile stress of layers 6 and 7, determine the usable pressure range of the sensor.

Passivation layer 11 that forms the uppermost layer of the structure is most advantageously made of silicon nitride or using a multilayer structure of silicon nitride and silicon dioxide. Typically, passivation layer 11 is about 500 nm thick.

In the pressure sensor embodiment shown in FIG. 2, the bottom electrodes of all the capacitive sensor elements are connected in parallel at a contact area located in the right lower edge of the sensor. Respectively, all the top electrodes are connected by the metallization layer at a contact area located in the left upper edge of the sensor. Hence, the capacitance between the bottom electrode contact and the top electrode contact is the overall capacitance of all the capacitive elements whose value is dependent on the differential pressure between the ambient pressure-transmitting medium and the internal volume of the sensor taken to a partial vacuum. Resultingly, a measurement of the overall capacitance is sufficient to determine the ambient pressure on the basis of the sensor calibration data.

In addition to the variable capacitance of the active area, the overall capacitance measurable across a sensor invariably includes an inherent capacitance of the sensor structure known as the stray capacitance. As a rule, the value of stray capacitance measured over a sensor structure is dependent on the component temperature and, e.g., ambient humidity. Since it is generally impossible to arrange a measurement over a single component such that the portion of the variable capacitance is detected separately from the stray capacitance, it is advantageous to integrate on the same silicon chip also a separate structure that can be used for eliminating the contribution of stray capacitances on the measured value of pressure. Such a reference structure of non-pressure-responsive capacitance is most preferably constructed as identical as possible to the pressure-responsive measuring sensor as to its capacitance dependence on ambient parameters (e.g., temperature and humidity).

To a person versed in the art it is obvious that the reference capacitance may also be constructed on a separate silicon chip, whereby the integration of a pressure sensor with a complete reference can be implemented using a suitable packaging technology.

Figure 3:
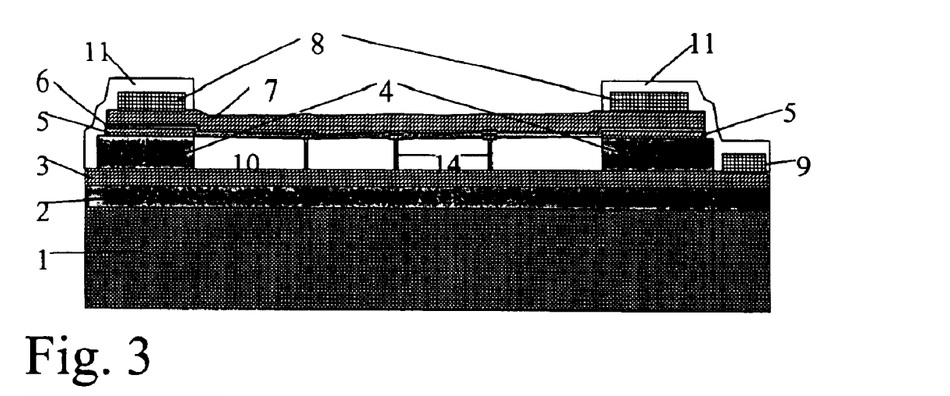
FIG. 3 is a cross-sectional view of a reference sensor element according to the invention.

In FIG. 3 is shown a cross-sectional view of the structure of a reference element according to the invention. As is evident from the diagram, the sacrificial layer contains within area 10 a number of column pads 14 formed by layers 4 and 5. The purpose of the pads is to stiffen the top electrode so as to eliminate the pressure responsiveness of the reference sensor capacitance. Typically, the circular column pads needed in the structure have a diameter of 1 $\mu$m to 10 $\mu$m. The number of pads serving to stiffen the top electrode formed by layers 6 and 7 (thereby reducing its pressure responsiveness) may be varied from 1 to 100 per capacitive element. As to the dimensioning of the sensor, it is essential that the overall area of column pads formed on area 10 of a single capacitive element of the reference sensor is substantially smaller than the overall area of the sensor element, whereby the element of the reference sensor is as identical as possible to the corresponding element of the actual pressure-responsive sensor except for its non-responsiveness to pressure variations.

Other techniques for reducing the responsiveness of the reference sensor to pressure can be found through increasing the thickness of layer 6 as well as from increasing the internal tensional stress of layers 6 and 7 in regard to that of the actual pressure-responsive elements.

Figure 4:
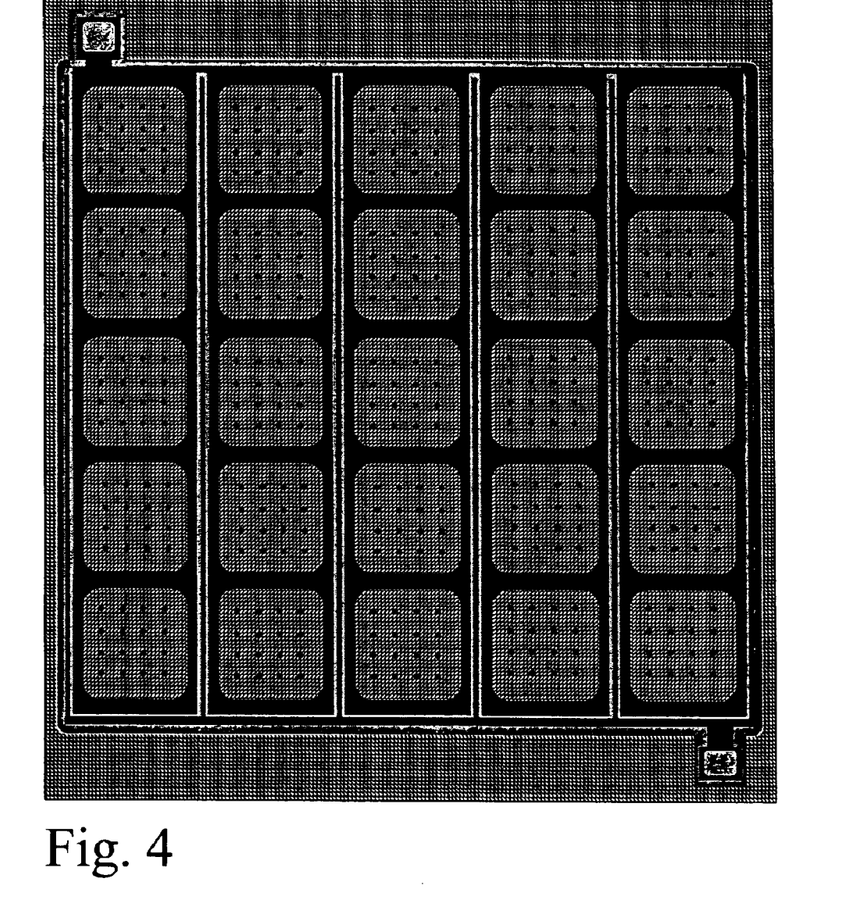
FIG. 4 is a top view of the reference element area of a capacitive pressure sensor according to the invention.
Figure 5:
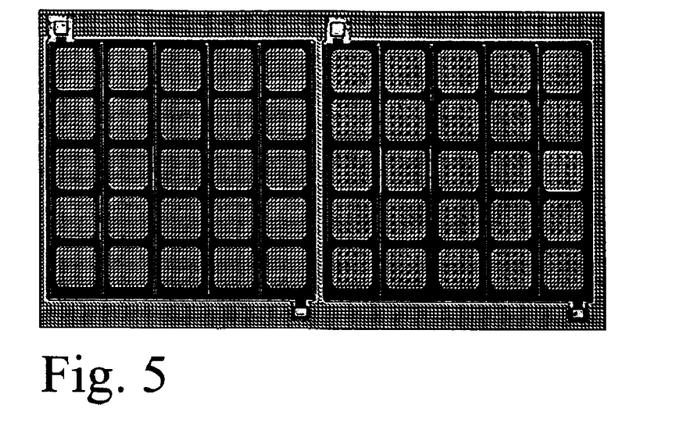
FIG. 5 is a schematic top view of a complete capacitive pressure sensor according to the invention.

In FIG. 4 is shown a top view of the reference area of a pressure sensor. The reference elements shown in the diagram have 16 supporting column pads over the area 10 of the sacrificial layer etched away placed so as to stiffen the diaphragm formed by layers 6 and 7.

To a person versed in the art it is obvious that the structure may be complemented by placing between the top and bottom electrodes an additional electrode known as a guard electrode that may be used, e.g., for eliminating measurement errors caused by surface leakage currents. Respectively, a person versed in the art is fully aware that the lowermost polycrystalline silicon layer (bottom electrode) 3 and the dielectric layer 2 may be omitted from the structure if it is desirable to use the silicon substrate alone as the bottom electrode.

Alternative Embodiment of the Structure

Figure 6:
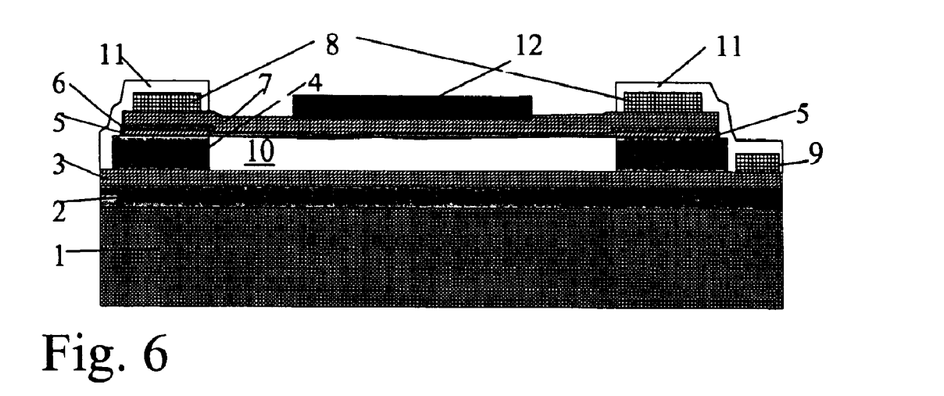
FIG. 6 is a cross-sectional view of an alternative embodiment of a sensor element according to the invention.

The relative proportion of the pressure-responsive capacitance in regard to the overall capacitance may be increased by making the elements thicker at their center areas. Thus, the layer subject to flexure under an external pressure flexes in the structure more at its edges than at its central area. As the central area remains at any pressure essentially flat over the entire span of pressure measurement, the proportion of the pressure-responsive capacitance in regard to the overall capacitance is resultingly increased. In a practicable realization of the sensor, the thicker portion 12 shown in FIG. 6 is most preferably made from polycrystalline silicon (analogously to layer 7).

The thicker area of the flexible diaphragm may also be made prior to the deposition of the porous polycrystalline silicon layer. However, the area must then be patterned with openings to achieve efficient etching-away of the sacrificial layer thereunder.

Figure 7:
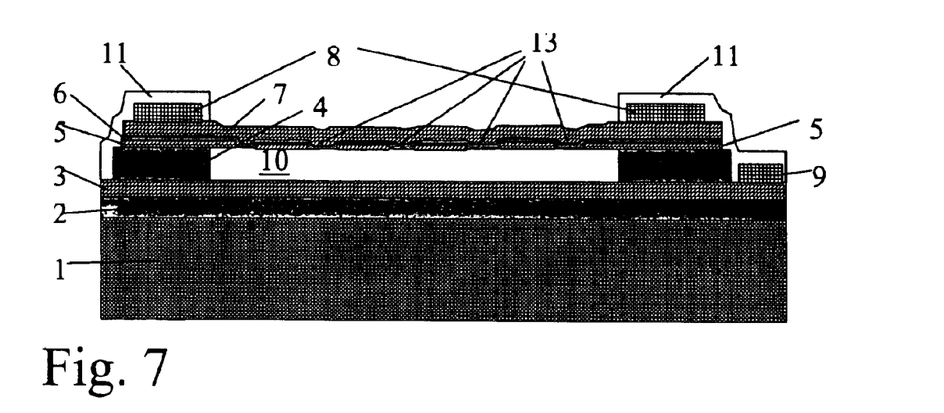
FIG. 7 is a cross-sectional view of a second embodiment of a sensor element according to the invention.

The basic structure (FIG. 3) may also be improved by extending layer 5 over the entire area of the flexible diaphragm. In FIG. 7 is shown a cross-sectional view of such a variant of the structure. In this construction, the stiffness of the diaphragm is improved by a layer 5 that most preferably is of the same material as layer 7 (that is, polycrystalline silicon). For proper etching-away the sacrificial layer in this embodiment of the sensor structure, layer 5 must be provided with one or more openings 13.

As an alternative embodiment of the sensor construction may also be interpreted such a structure wherein the lowermost polycrystalline silicon layer (bottom electrode) 3 and dielectric layer 2 are omitted. Then the bottom electrode may be formed by the silicon substrate 1 that is doped conductive.

Dimensioning of the Sensor

The sensor can be dimensioned (as to the layer thicknesses, geometry and tensional stresses) using commercially available FEM software. In the simplest case using circular areas as the flexible portions of the sensor elements, the dimensioning thereof can be performed with the help of the analytical tools [3] written below.

Flexure of a circular diaphragm (drum diaphragm):

$$Z(r) = \frac{p \cdot R^2}{4 \cdot \sigma \cdot h}\left[1 - \frac{r^2}{R^2}\right],$$

where p=pressure
R=radius of etched-free diaphragm area
σ=tensional stress of diaphragm
h=thickness of flexible diaphragm
r=distance from diaphragm center point

EXAMPLE $P = 1 \cdot 10^5$ Pa
h=1 μm (thickness of flexible polycrystalline silicon layer)
σ(at 3000 ppm strain)=$0.03 \cdot 160 \cdot 10^9$ Pa (tensional stress of diaphragm after thermal treatment of polycrystalline silicon diaphragm at 700° C., 1 h);
equation solving as Z(0)=0.5 μm when R=98 μm (whereby deflection of the diaphragm is half the sensor air gap at a pressure of $1 \cdot 10^5$ Pa and sacrificial layer thickness $d_u$ of 1 μm).

With the values of the example, about 25 elements fit on 1 mm².

Overall capacitance of sensor (having N elements) as a function of pressure:

$$C_e = \int_0^R \frac{2 \cdot N \cdot \varepsilon \cdot \pi \cdot r}{d_u - \frac{p \cdot R^2}{4 \cdot \sigma \cdot h}\left(1 - \frac{r^2}{R^2}\right)} dr$$

Figure 8:
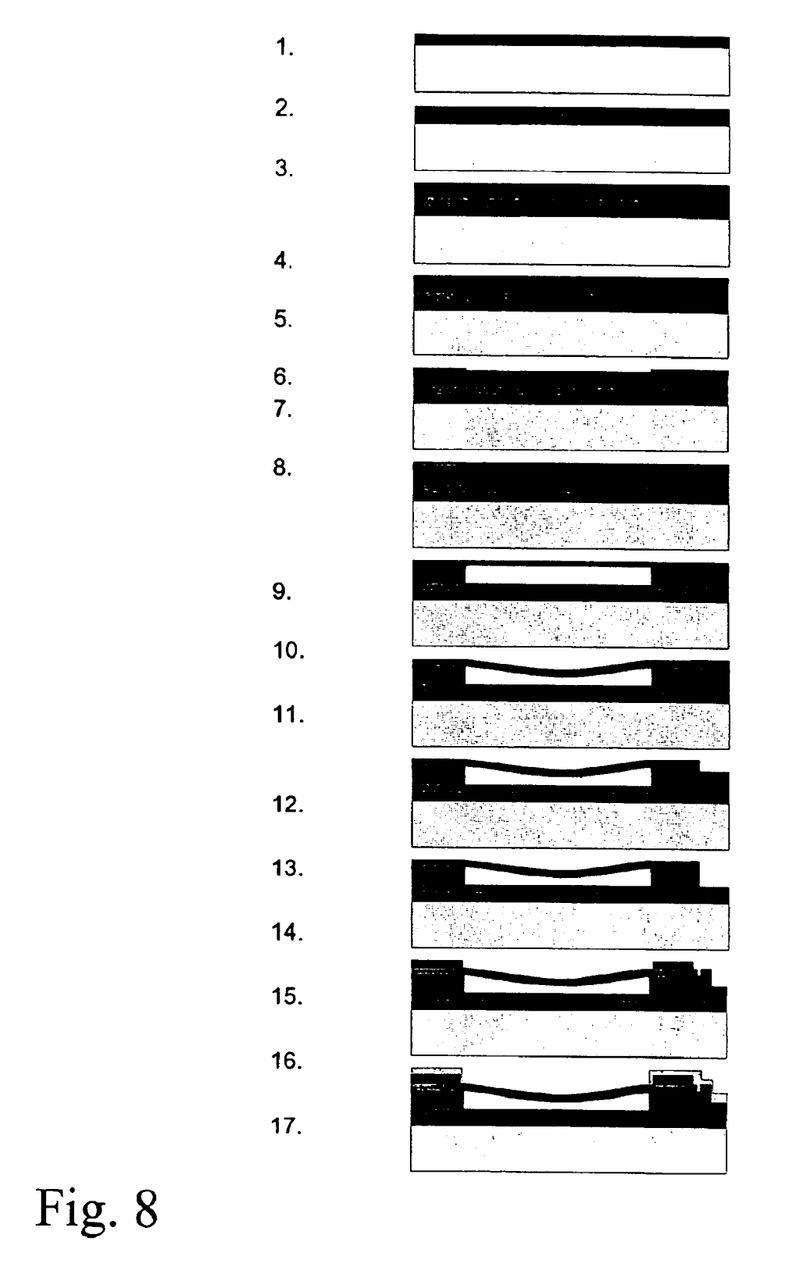
FIG. 8 is a schematic list of manufacturing steps in the fabrication method of a sensor according to the invention.

Referring to FIG. 8, the method comprises the following steps in order of execution:
1. Oxide layer growth
2. Amorphous silicon layer growth (complemented with, e.g., in situ doping with boron)
3. Thermal treatment
4. Patterning of polycrystalline silicon layer
5. Deposition of sacrificial layer (LTO)
6. Amorphous silicon layer growth (complemented with, e.g., in situ doping with boron)
7. Amorphous silicon layer patterning
8. Amorphous silicon layer growth (doping with boron, made porous/with openings, thickness 100 nm)
9. Thermal treatment
10. Sacrificial layer etching
11. Polycrystalline silicon layer growth (complemented with, e.g., in situ doping with boron)
12. Polycrystalline silicon layer patterning
13. LTO layer patterning
14. Metallization layer deposition
15. Metallization layer patterning
16. PECVD growth of silicon nitride layer
17. Patterning of PECVD grown silicon nitride layer.

As a rule, porous layer 6 must understood as a layer pervious to etching chemicals but impervious to the materials of layer 7 that is subsequently deposited thereon.

References

1. K. Kasten et al.: Sensors and Actuators A, Vol. 85 (2000), pp. 147–152.
2. Y. Kageyama, T. Tsuchiya, H. Fuanbashi, and J. Sakata: "Polycrystalline silicon thin films with hydrofluoric acid permeability for underlying oxide etching and vacuum encapsulation," J. Vac. Sci. Technol. A 18(4), July/Aug. 2000.
3. George S. K. Wong et al.: AIP Handbook of Condenser Microphones, Theory, Calibration and Measurements, AIP Press, New York, 1995, pp. 41–42.

What is claimed is:

1. A capacitive pressure sensor structure, in particular for measurement of absolute pressure, the sensor comprising:
   at least one fixed electrode;
   a dielectric layer formed on top of the at least one fixed electrode, a central portion of the dielectric layer being removed to form a space exposing a central portion of the at least one fixed electrode; and
   at least one movable electrode mounted on top of the dielectric layer and extending across the space, the at least one movable electrode thereby being electrically isolated from and separated from said at least one fixed electrode,
   wherein the space is partially vacuumed, and
   wherein a portion of said at least one movable electrode is formed from a porous polycrystalline silicon layer that is an integral portion thereof.

2. The sensor structure of claim 1, wherein a structure remaining under edges of said porous polycrystalline silicon layer is stiffened by providing thereunder a uniform silicon layer having openings made thereto.

3. The sensor structure of claim 1, wherein columnar pads are formed within the space thereby forming a reference sensor element.

4. The sensor structure of claim 1, wherein a central area of the at least one movable electrode includes a thick portion that serves to stiffen the at least one movable electrode at the central area thereof.

5. The sensor structure of claim 1, further comprising a polycrystalline silicon layer that is impervious to gas deposited over the porous polycrystalline silicon layer so that the at least one movable electrode becomes impervious to gases.

6. The sensor structure of claim 1, wherein the sensor structure constitutes a plurality of single sensor elements connected in parallel or series with each other.

7. The sensor structure of claim 1, wherein the sensor structure is manufactured using silicon micromechanical techniques.

8. The sensor structure of claim 1, wherein the sensor structure is an absolute pressure sensor.

9. A method of manufacturing a capacitive pressure sensor structure, in particular a sensor for measurement of absolute pressure, the sensor comprising the steps of:

providing at least one fixed electrode;

providing a dielectric layer on said at least one fixed electrode;

etching-away predetermined portions of a central portion of the dielectric layer to form a space exposing a central portion of the at least one fixed electrode, the dielectric layer being etched so that a plurality of columnar pads remain in the central portion of the dielectric layer and edge portions of the dielectric layer remain around the space, and providing at least one movable electrode on top of the dielectric layer, the at least one movable electrode being electrically isolated from said at least one fixed electrode by the space, characterized in that wherein a portion of said at least one movable electrode is formed from a porous polycrystalline silicon layer that is an integral portion thereof.

10. The method of claim 9, wherein during the step of etching the dielectric layer, the edge portions of the dielectric layer are left byway of not carrying the the etching step to completion in a lateral direction.

11. The method of claim 9, further comprising the step of providing a uniform silicon having openings under the porous polycrystalline silicon layer in order to stiffen the porous polycrystalline silicon layer.

12. The method of claim 9, wherein a central portion of the at least one movable electrode includes a thick area that serves to stiffen the at least one movable electrode at the central area thereof.

13. The method of claim 9, a polycrystalline silicon layer that is impervious to gas over the porous polycrystalline silicon layer such that the at least one movable layer becomes impervious to gases.

14. The method of claim 9, wherein the sensor structure constitutes a plurality of single sensor elements connected in parallel or series with each other.

15. The method of claim 9, wherein the sensor structure is manufactured using silicon micromechanical techniques.

16. The method of claim 9, further comprising the step of creating a partial vacuum in the space via the porous polycrystalline silicon layer.

17. The method of claim 9, further comprising the step of sealing the sensor structure by depositing onto said porous polycrystalline silicon layer another polycrystalline silicon layer in a process that leaves a partial vacuum in the space in an interior of the sensor structure.

* * * * *

UNITED STATES PATENT AND TRADEMARK OFFICE
CERTIFICATE OF CORRECTION

PATENT NO.       : 6,931,935 B2
APPLICATION NO.  : 10/416267
DATED            : August 23, 2005
INVENTOR(S)      : Martii Blomberg It is certified that error appears in the above-identified patent and that said Letters Patent is hereby corrected as shown below:

Title Page, Item (73) Please correct the second Assignee to read as
--Valtion Teknillinen Tutkimusekeskus--.

Signed and Sealed this

Twelfth Day of September, 2006

JON W. DUDAS
*Director of the United States Patent and Trademark Office*

UNITED STATES PATENT AND TRADEMARK OFFICE
CERTIFICATE OF CORRECTION

PATENT NO.         : 6,931,935 B2
APPLICATION NO. : 10/416267
DATED              : August 23, 2005
INVENTOR(S)        : Martti Blomberg

It is certified that error appears in the above-identified patent and that said Letters Patent is hereby corrected as shown below:

Title page; Item (73) Please correct the spelling of the second Assignee to read as -- Valtion Teknillinen Tutkimuskeskus --

Signed and Sealed this

Twenty-third Day of January, 2007

JON W. DUDAS
*Director of the United States Patent and Trademark Office*